(12) United States Patent
Weeber et al.

(10) Patent No.: US 6,703,729 B2
(45) Date of Patent: Mar. 9, 2004

(54) REVERSE FLOW STATOR VENTILATION SYSTEM FOR SUPERCONDUCTING SYNCHRONOUS MACHINE

(75) Inventors: Konrad Roman Weeber, Rexford, NY (US); Richard Nils Dawson, Voorheesville, NY (US)

(73) Assignee: General Electric Company, Schenectady, NY (US)

( * ) Notice: Subject to any disclaimer, the term of this patent is extended or adjusted under 35 U.S.C. 154(b) by 13 days.

(21) Appl. No.: 09/929,287

(22) Filed: Aug. 15, 2001

(65) Prior Publication Data

US 2003/0034701 A1 Feb. 20, 2003

(51) Int. Cl.[7] .................................................. H02K 9/00
(52) U.S. Cl. ............................................. 310/52; 310/58
(58) Field of Search ................................. 310/52, 58, 64

(56) References Cited

U.S. PATENT DOCUMENTS

| | | | |
|---|---|---|---|
| 926,086 A | 6/1909 | Behrend | |
| 3,634,705 A | 1/1972 | Fidei | |
| 3,733,502 A * | 5/1973 | Curtis et al. | 310/61 |
| 3,868,520 A * | 2/1975 | Curtis et al. | 310/61 |
| 3,908,140 A * | 9/1975 | Fidei et al. | 310/54 |
| 3,916,230 A * | 10/1975 | Albaric et al. | 310/61 |
| 4,071,791 A | 1/1978 | Armor et al. | 310/59 |
| 4,141,669 A | 2/1979 | Darby et al. | 408/1 R |
| 4,146,804 A * | 3/1979 | Carr, Jr. | 310/52 |
| 4,236,091 A * | 11/1980 | Kutateladze et al. | 310/64 |
| 4,352,034 A * | 9/1982 | Karhan et al. | 310/59 |
| 4,406,959 A * | 9/1983 | Harano et al. | 310/58 |
| 4,426,592 A * | 1/1984 | Berzin et al. | 310/52 |
| 4,845,394 A * | 7/1989 | Kleinhans | 310/64 |
| 5,532,663 A * | 7/1996 | Herd et al. | 335/216 |
| 5,548,168 A * | 8/1996 | Laskaris et al. | 310/52 |
| 5,633,543 A | 5/1997 | Jarczynski et al. | 310/59 |
| 5,652,469 A | 7/1997 | Boardman et al. | 310/58 |
| 5,869,912 A | 2/1999 | Andrew et al. | 310/52 |
| 6,140,719 A * | 10/2000 | Kalsi | 310/52 |
| 6,169,353 B1 * | 1/2001 | Driscoll et al. | 310/261 |
| 6,201,323 B1 * | 3/2001 | Semba et al. | 310/52 |
| 6,204,580 B1 | 3/2001 | Kazmierczak | 310/52 |
| 6,252,318 B1 | 6/2001 | Kazmierczak | 310/61 |
| 6,313,556 B1 * | 11/2001 | Dombrovski et al. | 310/91 |

* cited by examiner

*Primary Examiner*—Joseph Waks
(74) *Attorney, Agent, or Firm*—Nixon & Vanderhye, P.C.

(57) ABSTRACT

A synchronous machine includes a rotor coupled to a rotor cooling system; a stator around the rotor and separated from the rotor by an annular gap between the rotor and an inner surface of the stator, and a stator ventilation system separate and independent of the rotor cooling system.

13 Claims, 5 Drawing Sheets

REVERSE FLOW STATOR VENTILATION SYSTEM FOR SUPERCONDUCTING SYNCHRONOUS MACHINE

BACKGROUND OF THE INVENTION

The invention relates to superconducting synchronous electrical machines with a reverse flow ventilation system to cool the stator of the machine.

In the process of producing electricity, power generators create heat that must be dissipated from the generator. Heat occurs in generators due primarily to windage and friction, electric current flow, and time-varying magnetic fields in magnetic structures. Frictional heating occurs as the rotor spins at high speed in the generator. Similarly, heating also occurs as current flows through the rotor and stator coils, as these coils rotate relative to one another in the magnetic fields of the generator. Losses in the magnetic circuit occur as the magnetic fields change with time in permeable materials, such as for example in the stator core and the rotor poles of a synchronous generator. Generators are conventionally equipped with cooling systems to transfer heat from the stator and rotor away from the generator.

Gas ventilation cooling systems have been used in conventional synchronous machines, such as generators and motors, that do not employ superconducting materials. These gas ventilation systems tightly couple the cooling of stator and rotor. The ventilation system cools both the rotor and stator by forcing cooling gas through gas passages in the rotor and stator. Conventional ventilation systems have employed forward flow and reverse flows of cooling gases through the stator and rotor.

In conventional synchronous machines, such as synchronous generators and motors, the ventilation system of gas-cooled machines tightly couples the cooling of stator and rotor. In the forward flow ventilation scheme (FIG. 1) the cooling gas flows through sections of the rotor and stator in series which creates a tight coupling between rotor and stator cooling systems. In the reverse flow ventilation scheme (FIG. 2) the cooling gas flows through stator and rotor in parallel, but then mixes in the machine air gap, also leading to a coupling of the stator and rotor cooling.

Because of the coupling of the cooling of the rotor and stator, the ventilation system must be configured to provide adequate cooling for both the stator and rotor. To provide cooling for the rotor, some compromises may have to be made in a conventional ventilation system with respect to cooling the stator and vice versa. It may be difficult to optimize the cooling of either the stator or rotor with a ventilation system that must provide cooling for both the rotor and stator. Nevertheless, ventilation systems have conventionally provided cooling for both the stator and rotor in large industrial and utility power generators.

In a superconducting synchronous machine the rotor field winding is operated at cryogenic temperatures through a cryorefrigeration system that has its own self-contained cooling circuit. A cold, cryogenic coolant is supplied to the rotor through a transfer coupling, from where it is circulated through a cooling circuit on the rotor where it picks up heat to be removed, and then returns to a stationary cooling system through the transfer coupling. This cryogenic cooling system provides effective cooling of the rotor in a superconducting machine.

BRIEF SUMMARY OF THE INVENTION

The cryogenic cooling system for a superconducting rotor does not cool the stator. The stator of such a superconducting synchronous machine requires a stator cooling system. Contrary to conventional machines where stator and rotor cooling systems are coupled in a single ventilation system, the cooling system of the cryogenic rotor and the gas-cooled stator may be completely independent. Thus, a stator cooling system is needed to cool the stator in a synchronous machine having a superconducting rotor.

A stator ventilation system has been developed for a superconducting synchronous machine. The stator of a superconducting synchronous machine is cooled by a reverse ventilation system in which a cooling gas, such as air or hydrogen, is drawn from the air gap and pumped through a diffuser, heat exchanger and through the stator core back to the air gap. In addition, a conventional synchronous machine may be retrofit with a superconducting rotor and a conventional ventilation system modified to embody the ventilation system disclosed here. An alternate stator ventilation configuration follows the principle of forward flow, in which the air flows through the stator in the opposite direction to the reverse flow stator cooling system.

In one embodiment, the invention is a synchronous machine comprising: a rotor coupled to a rotor cooling system; a stator around the rotor and separated from the rotor by an annular gap between the rotor and an inner surface of the stator, and a stator ventilation system separate and independent of the rotor cooling system.

In another embodiment, the invention is a superconducting electromagnetic machine comprising: a solid core rotor having a cryogenically cooled superconducting rotor coil winding; a stator coaxial with said rotor and having stator coils magnetically coupled with said superconducting rotor coil winding, said stator coils arranged around said rotor, and said stator having cooling passages extending from an outer periphery of the stator to an inner periphery of the stator, said inner periphery separated from the rotor by an annular air gap; said rotor having cooling passages for cryogenic cooling fluid; a stator ventilation system providing cooling gas to said outer periphery of the stator and said passages of the stator.

In a further embodiment, the invention is a method for cooling a superconducting electromagnetic machine having a solid core rotor including a superconducting rotor coil winding and a stator and a stator ventilation system, said method comprising the steps of: cryogenically cooling the rotor coil winding independently of cooling the stator; cooling the stator with a cooling gas flowing through the stator, and drawing the cooling gas out of the stator into an air gap between the stator and rotor core, where the cooling gas is isolated from any rotor cooling system.

The proposed stator cooling systems are independent of the type of superconducting rotor configurations, and can be equally applied to iron-core and air-core superconducting rotors.

DETAILED DESCRIPTION OF THE INVENTION

Figure 1:
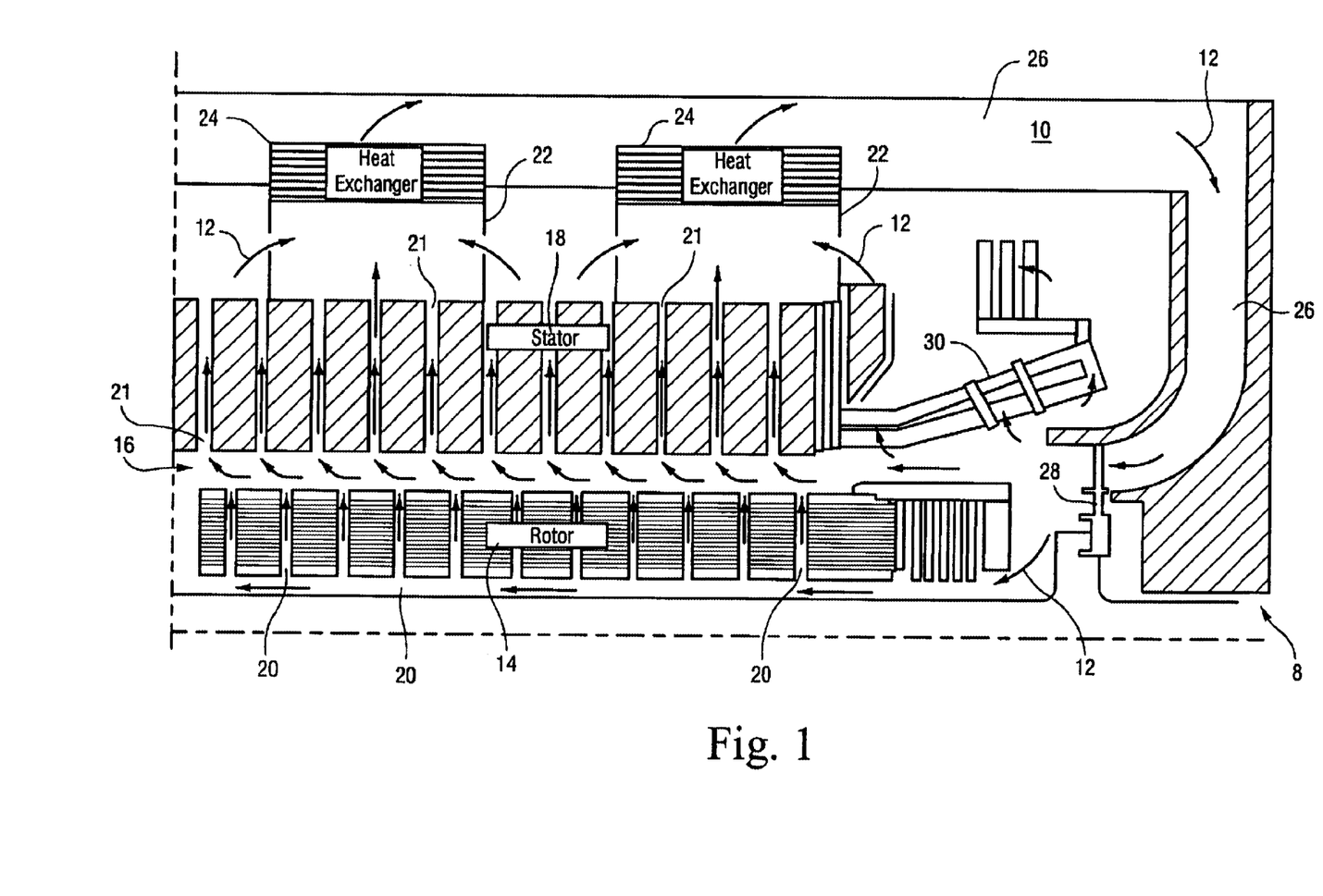
FIG. 1 is a schematic cross-sectional diagram of a quarter-section of a generator showing a conventional forward-flow cooling system.

FIG. 1 shows a conventional generator 8 having a conventional forward flow ventilation system 10, in which cooling gas (arrows 12) flows through the rotor 14, and/or rotor air gap 16, and then through the stator 18. The cooling gas flows through radial gas passages 20 in the rotor and similar radial gas passages 21 in the stator in series which creates a tight coupling between rotor and stator cooling systems.

As the cooling gas flows through the rotor, heat in the rotor is transferred to the gas as the temperature of the gas rises towards the temperature of the rotor coils. The heated gas exiting the rotor and the cooling gas that directly entered the air gap 16 mix and become the cooling gases that enter the stator. The mixed cooling gases enter the stator passages 21 at an interior stator surface that surrounds the rotor. As the gases move through the stator, heat from the hot stator coils is transferred to the cooling gases and removed from the stator as when the gases exit the stator.

From the outer periphery of the stator, the heated cooling gases pass through annular ducts 22 that surround the stator and direct the hot gases to the heat exchangers. The hot gases are cooled in heat exchangers 24, flow through recirculation ducts 26 and are pumped back into the rotor and air gap by an appropriate radial or axial fan 28. The cooling gases are also driven through the rotor and into the gap 16 by centrifugal forces in the rotor. In addition, some of the cooling gases exiting the fan 28 are directed to cool the end turns 30 of the stator coil windings.

Figure 2:
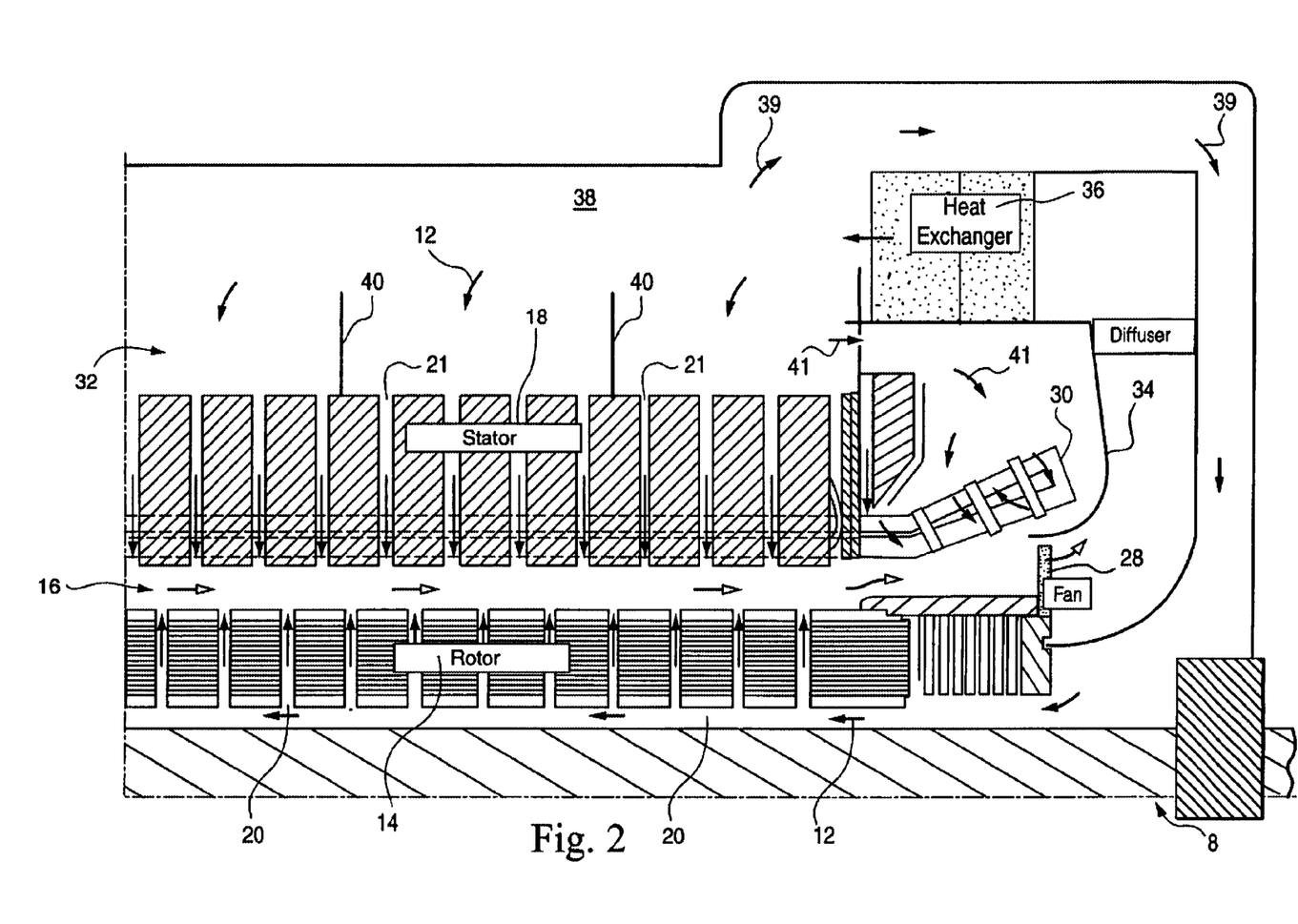
FIG. 2 is a schematic cross-sectional diagram of a quarter-section of a generator showing a conventional reverse-flow cooling system.

FIG. 2 illustrates a conventional reverse flow ventilation system 32 in which cooling gas flows through stator 18 and rotor 14 in parallel. The heated cooling gas exits both the rotor and stator into the air gap 16. The mixing in the air gap of the cooling gases from the stator and rotor results in a coupling of the cooling systems for the rotor and stator.

Reverse flow cooling in a conventional electrical machine 8 delivers cold gas (arrows 12) simultaneously to both the stator 18 and the rotor 14 by providing parallel inlet paths to the stator core and the rotor entrance. Cold gas flows from a cooler, e.g., heat exchanger, into the outer periphery of the stator core, which may contain baffles to control the airflow through the stator core, and into the air gap. Cold gas also flows from the cooler into the ends of the rotor, and, generally through cooling gas sub-slots 20 and radially outwardly through gas flow passages in the rotor slots 20, to the generator air gap 16. A fan 28 attached to the rotor circulates the exhaust gas from the air gap back to the cooler.

In particular, FIG. 2 shows a cross section of a generator 8 having a conventional reverse flow ventilated cooling system 32. U.S. Pat. No. 5,633,543 shows an exemplary reverse flow ventilation system. A portion of the flow of cooling gases (arrow 12) is drawn into the rotor by centrifugal forces acting on the gases passing through the rotor passages 20. The cooling gases may be air, hydrogen or some other cooling gas. The heated rotor gases exit the ducts at the surface of the rotor into the air gap 16 between the rotor and stator. A spinning fan 28 mounted at the end(s) of the rotor draws the heated gas from the gap 16 between the stator and rotor, and into an external duct diffuser 34 that directs the gases to a heat exchanger 36 that cools the gas.

In a reverse flow system, the stator 18 is cooled by ventilation flow paths that are separate from the flow paths in the rotor. Gases cooled by the heat exchanger 36 enters a plenum chamber 38 surrounding the stator. A portion (arrow 39) of the cooled gas from the heat exchanger is directed towards the rotor. A portion (arrows 41) of the cooling gas is directed to cool the stator end turns.

In the stator plenum chamber 38, the cooling gas passes through baffles 40 in the chamber (or directly to the stator near the center of the stator) and into cooling gas passages 21 that are open at the outer circumferential surface of the stator. As the gas flows radially inward through the stator, heat from the stator coils is transferred to the gas. The hot gas flows from the stator into the air gap. The rotor fans 28 draw the warmed gas from the air gap 16 and out to the external duct 34 to the heat exchanger 36. The cooled gas from the heat exchanger is exhausted from exhaust ports to the plenum chamber 38 around the stator.

Figure 3:
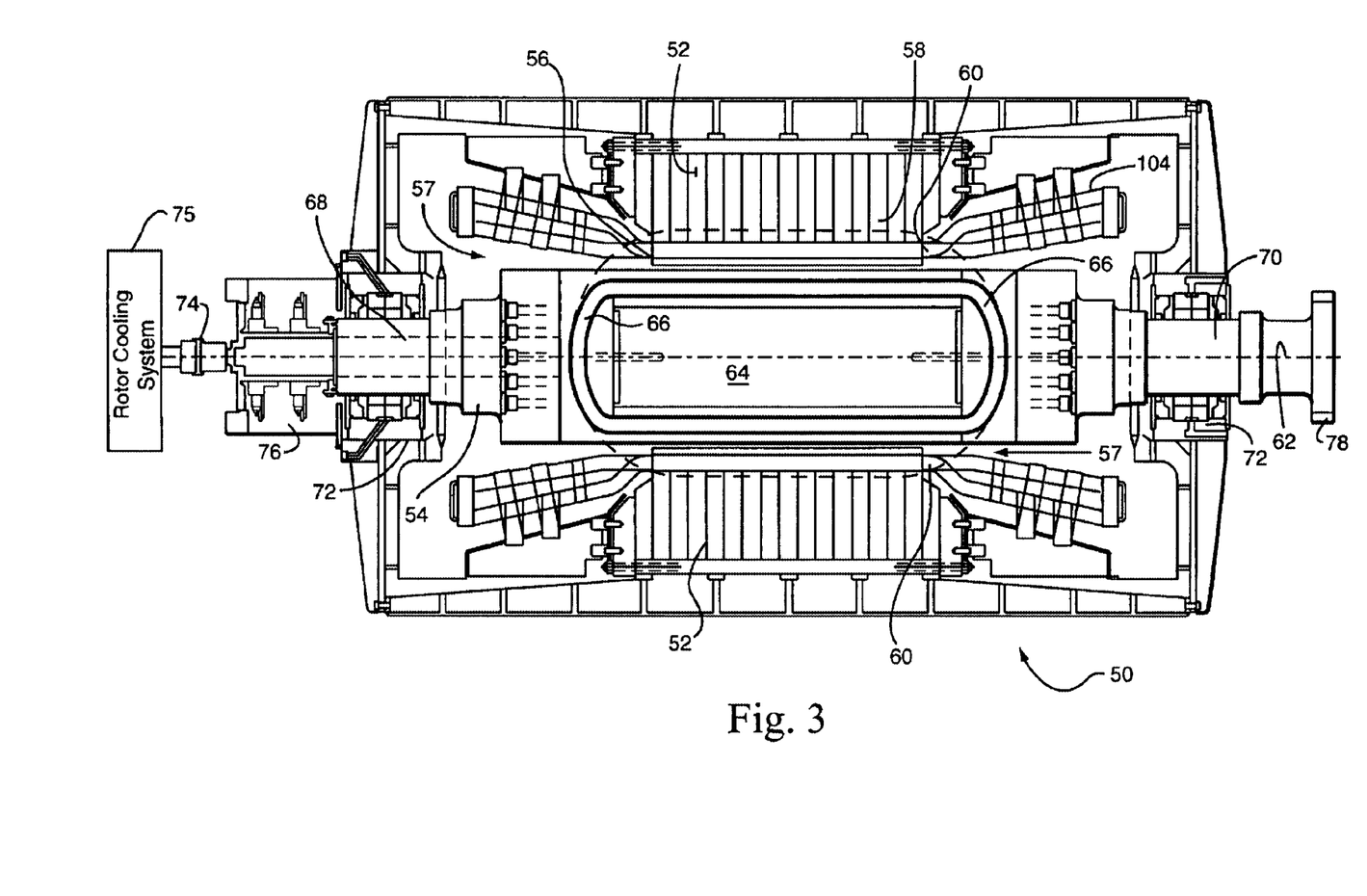
FIG. 3 is a schematic diagram of a synchronous electromagnetic machine having a superconducting rotor.

FIG. 3 shows an exemplary synchronous generator machine 50 having a stator 52 and a rotor 54. While the machine 50 is shown as a generator, it may also be configured as an electric motor. In the generator, the rotor includes field winding coil 66 that fit inside the cylindrical rotor cavity 56 of the stator. An annular gap 57 is formed between the outside periphery of the rotor and the cylindrical surface of the stator that defines a cylindrical cavity 56 which receives the rotor. As the rotor turns within the stator, a magnetic field generated by the rotor and rotor coils moves/ rotates through the stator and creates an electrical current in the windings of the stator coils 60. This current is output by the generator as electrical power.

The rotor 54 has a generally longitudinally-extending axis 62 and a generally solid rotor core 64. The solid rotor core 64 has high magnetic permeability, and is usually made of a ferromagnetic material, such as iron. In a low power density superconducting machine, the iron core of the rotor is used to reduce the magnetomotive force (MMF), and, thus, minimize the amount of superconducting (SC) coil wire needed for the coil winding.

The rotor 54 supports at least one longitudinally-extending, racetrack-shaped, high-temperature superconducting (HTS) coil winding 66. The HTS coil winding may be alternatively a saddle-shape or have some other shape that is suitable for a particular HTS rotor design. The HTS coil winding is cooled by cryogenic fluid supplied to the rotor by an outside source of cooling fluid. The cooling of the rotor and its HTS coils is independent of and isolated from cooling systems for other components of the generator 50, such as the stator 52.

The rotor includes a collector end shaft 68 and a drive end shaft 70 that bracket the rotor core 64, which are supported by bearings 72. The end shafts may be coupled to external devices. For example, the collector end shaft 68 has a cryogen transfer coupling 74 to a source 75 of cryogenic cooling fluid used to cool the SC coil windings in the rotor.

The cryogen transfer coupling 74 includes a stationary segment coupled to a source of cryogen cooling fluid and a rotating segment which provides cooling fluid to the HTS coil. The collector end shaft 68 also includes a collector 76 for electrically connecting to the rotating SC coil winding. The drive end shaft 70 of the rotor may be driven by a power turbine coupling 78.

Figure 4:
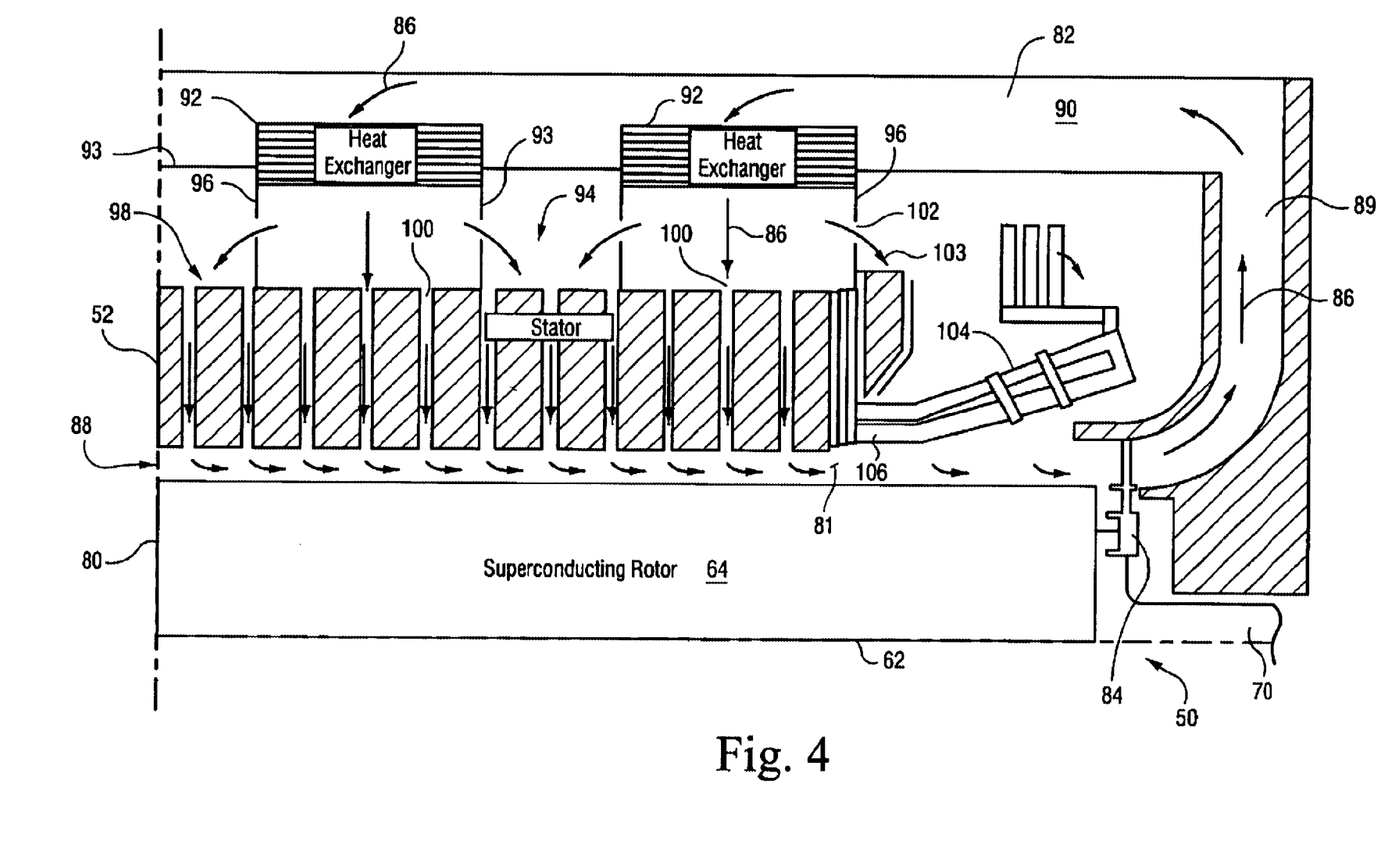
FIG. 4 is a schematic cross-sectional diagram of a quarter section of a superconducting generator having a solid rotor and a stator closed ventilation system.

FIG. 4 shows a cross-section of one-half of a generator 50 (see rotor axial center-line 62 and longitudinal center-line 80) having a reverse flow, ventilated stator cooling system 82. The cooling system provides cooling gas, e.g., ambient air or hydrogen, to the stator. The stator cooling system is independent of and isolated from the cryogenic cooling system that provides cryogen cooling fluid to the rotor.

The stator ventilation system 82 includes a cooling gas fan 84 that is affixed to an end(s) shaft (68 and/or 70) of the rotor. The fan 84 spins with the rotor to draw heated cooling gas (arrows 86) from an a port 81 of annular air gap 88 between the rotor and stator. The hot gas drawn from the gap is pumped by the fan, through a gas passage 89, and into an external gas duct plenum chamber/diffuser 90 that extends around stator of the generator.

The plenum chamber duct 90 shows the high pressure/velocity gas from passage 89 and directs the warmed gas to one or more heat exchangers 92. The heat exchangers extract heat from the gas and cools the gas so that it may be recirculated to cool the stator. Cooled gas from the heat exchanger enters a baffle chamber 94 surrounding the outer periphery of the stator. The baffle chamber may have an outer wall 93 that circumferentially surrounds the stator and has openings for the heat exchangers. The baffle chamber may include annular walls 96 attached to the stator, to distribute the cooling air to the stator. The baffle chamber directs cooled gas to the outer circumference 98 of the stator. The plenum chamber may include baffles that optimally distribute the flow of cooling gas over the stator and into the stator cooling passages 100. The outer walls of the plenum chamber may also include an exhaust port 102 that bleeds cooling gas 103 from the chamber to the end of the stator and over the end-turns 104 of the stator coils 106.

Heat is extracted from the stator coils as the cooling gas passes through the stator cooling passages 100. The passages may be arranged in the stator to optimize the cooling of the stator coils. For example, the frequency of cooling passages along the stator axis and/or the cross-sectional area of the passages may be selected to evenly distribute cooling in the stator or to otherwise optimize stator cooling.

The heated cooling gas flows from the stator passages 100 into the air gap 88. The cooling gas is drawn through the gap by the fan 84 and passage 82, where the cooling gas is then cooled by the heat exchanger 92 and recirculated back through the stator. The ventilation system 82 may be a closed gas system wherein cooling gas, e.g., hydrogen or air, is circulated through the stator, heat exchanger and plenum to cool the stator.

In a closed loop ventilation system 82 for a machine with a superconducting rotor, the cooling gas such as air or hydrogen is circulated from the heat exchanger(s) 92 through the stator cooling passages 100 to extract heat from the stator coils, the air gap 88 to an axial fan 84, and back to the heat exchanger. The cold cooling gas, exiting from the heat exchangers, cools the stator core and stator winding. The space between stator end winding 104 and machine flange has one gas flow path 89 to duct the hot gas from the fan 84 to the heat exchangers. This one gas passage simplifies the complexity of the reverse flow ventilation system of conventional machines which have two flow paths (see FIG. 2 and passages 34 and 39).

The stator cooling system is also applicable for synchronous machines where a conventional rotor is replaced with a superconducting rotor. In such a case, the forward or reverse flow ventilation system of the original machine may be converted to the reverse flow system shown in FIG. 3, 4 or 5.

Figure 5:
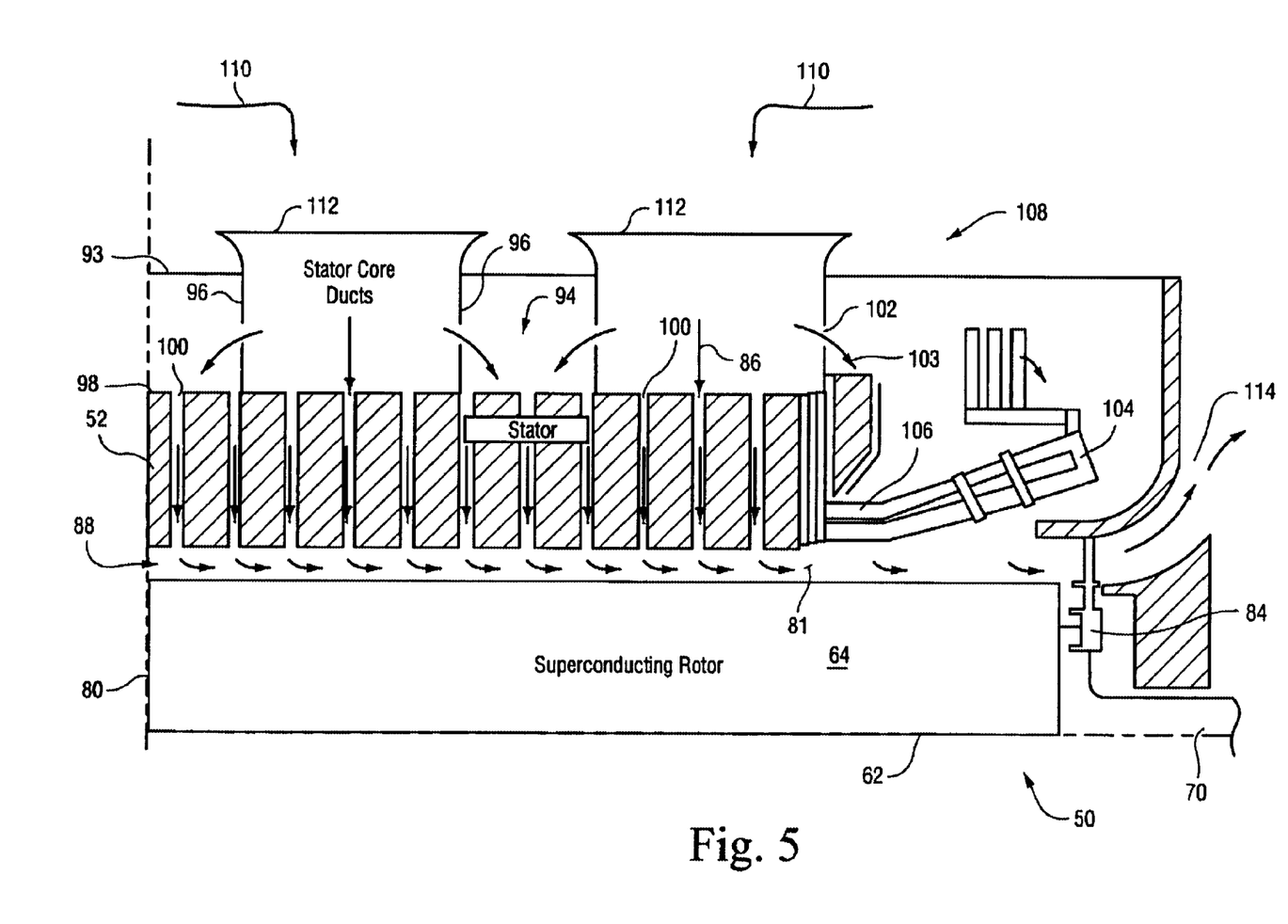
FIG. 5 is a schematic cross-sectional diagram of quarter section of a superconducting generator having a solid core rotor and an open stator ventilation system.

FIG. 5 shows an open-loop reverse flow ventilation system 108 in which cooling gases are drawn from an outside source, e.g., ambient air (arrows 110), and pass through as an input port 112. The cool inlet gas passes through the baffle chamber 94, stator passages 100, air gap 88 and the fan 84 in a manner similar to the flow of cooling gas in the closed ventilation system 82. The fan moves the heated air out from the air gap and provides the driving force to draw air through the ports 112 and through the stator. In an open loop system, air, is drawn into the machine through inlets and vented back to the environment through discharge ducts 114. Thus, heat exchangers and other passages are unnecessary in an open system.

The ventilation systems shown in FIGS. 4 and 5 may be applied to polyphase alternating current (AC) machines with a superconducting (SC) rotor and a stator carrying polyphase AC winding(s).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A superconducting electromagnetic machine comprising:

a solid core rotor having a cryogenically cooled superconducting rotor coil winding;

a stator coaxial with said rotor and having stator coils magnetically coupled with said superconducting rotor coil winding, said stator coils arranged around said rotor, and said stator having cooling passages extending from an outer periphery of the stator to an inner periphery of the stator, said inner periphery separated from the rotor by an annular air gap;

said rotor having cooling passages for a cryogenic cooling fluid;

an annular air gap between said solid core rotor and said stator, wherein said annular gap having at least one lateral opening comprising a cooling gas passage port and said annular gap being substantially open along a length of said rotor;

a stator ventilation system providing a cooling gas to said outer periphery of the stator and said passages of the stator, wherein substantially all of said cooling gas flows through said annular gap and through said cooling gas passage port, wherein said ventilation system further comprises a plurality of baffle chambers adjacent said outer periphery of the stator, wherein said baffle chambers include a first chamber having an outer cooling gas inlet port open to a source of cooling gas and a second chamber having cooling gas inlet port open to said first chamber, and wherein said first and second chambers each have cooling gas outlets to said stator.

2. A superconducting electromagnetic machine as in claim 1 wherein the cooling gas exits the stator at said cooling gas passage port open to the annular air gap.

3. A superconducting electromagnetic machine as in claim 1 wherein said ventilation system further comprises heat exchanger.

4. A superconducting electromagnetic machine as in claim 1 wherein said rotor comprises a superconducting coil, and said rotor cooling system provides cryogenic cooling fluid to said coil.

5. A superconducting electromagnetic machine as in claim 1 which is an electromagnetic generator.

6. A synchronous machine as in claim 1 which is a motor.

7. A superconducting electromagnetic machine as in claim 1 wherein said ventilation system is a reverse flow ventilation system.

8. A superconducting electromagnetic machine as in claim 1 wherein said ventilation system is a closed-loop system in which a cooling gas circulates through the stator and a heat exchanger in a flow path of the gas.

9. A superconducting electromagnetic machine as in claim 1 wherein said stator cooling passages are adjacent and orthogonal to said stator coils.

10. A method for cooling a superconducting electromagnetic machine having a solid core rotor including a superconducting rotor coil winding and a stator and a stator ventilation system, said method comprising the steps of:

a. cryogenically cooling the rotor coil winding;
   b. cooling the stator with a cooling gas flowing through the stator, wherein said cooling gas enters an outer periphery of the stator from a plurality of baffle chambers and wherein a first baffle chamber has a cooling gas input port open to a source of cooling gas and a second baffle chamber has an input port open to the first baffle chamber, and
   c. drawing substantially all of the cooling gas our of the stator into an air gap between the stator and the rotor core, wherein the cooling gas flows through the air gap without flowing through the rotor core.

11. A method for cooling as in claim 10 wherein the cooling gas flows into an outer periphery of the stator, through stator cooling gas passages and out into the air gap.

12. A method for cooling as in claim 10 wherein said cooling gas is drawn by a fan out of the air gap and is exhausted out of the machine.

13. A method for cooling as in claim 10 wherein said cooling gas is drawn by a fan out of the air gap and is directed to a heat exchanger, and said method further comprises extracting heat from the cooling gas by the heat exchanger, and circulating the cooling gas through the stator and the heat exchanger.

* * * * *

UNITED STATES PATENT AND TRADEMARK OFFICE
CERTIFICATE OF CORRECTION

PATENT NO. : 6,703,729 B2
DATED : March 9, 2004
INVENTOR(S) : Weeber et al.

It is certified that error appears in the above-identified patent and that said Letters Patent is hereby corrected as shown below:

Column 8,
Line 1, delete "gas our of" and insert -- gas out of --.

Signed and Sealed this

Twenty-sixth Day of October, 2004

JON W. DUDAS
*Director of the United States Patent and Trademark Office*